July 8, 1924.
B. E. LEAS
RAKE
Filed March 6, 1923
1,501,006
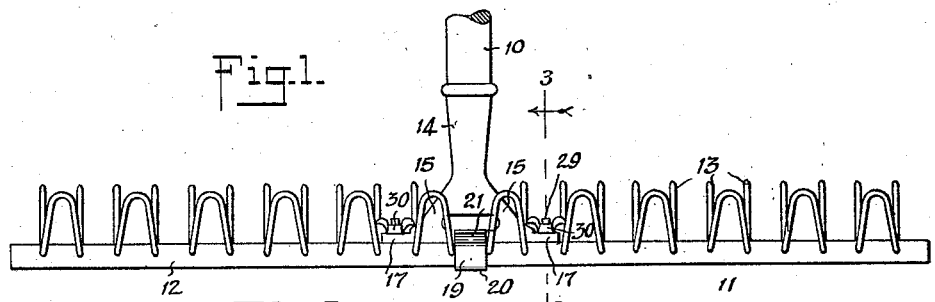
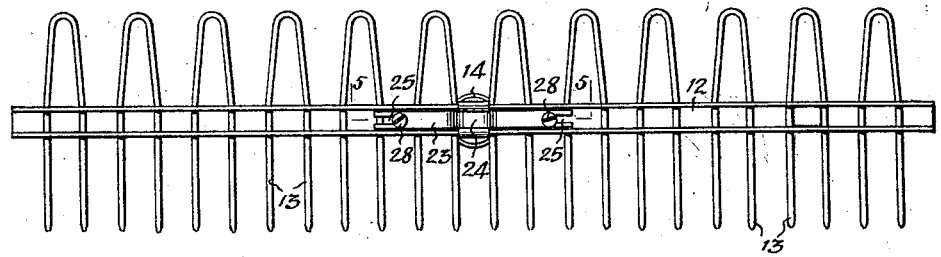
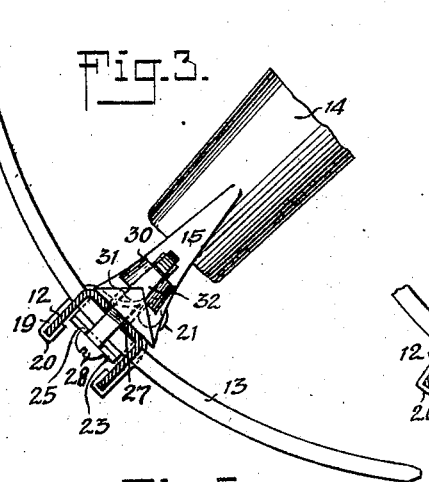
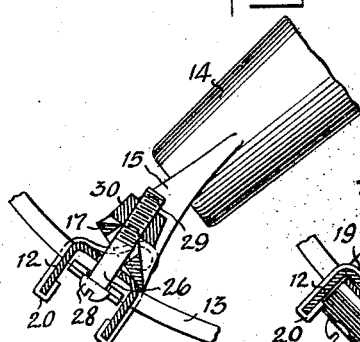
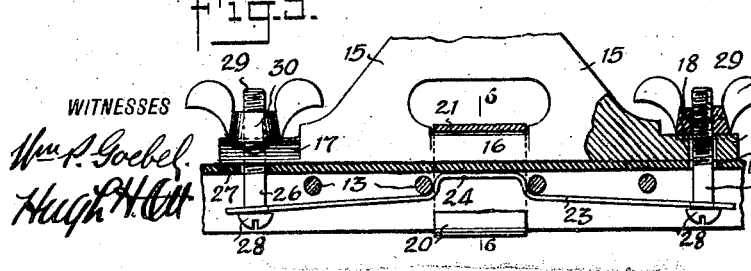
WITNESSES
INVENTOR
BERT E. LEAS
BY
ATTORNEYS Patented July 8, 1924.

1,501,006

UNITED STATES PATENT OFFICE.

BERT ELWOOD LEAS, OF LUVERNE, MINNESOTA.

RAKE.

Application filed March 6, 1923. Serial No. 623,222.

*To all whom it may concern:*

Be it known that I, BERT ELWOOD LEAS, a citizen of the United States, and a resident of Luverne, in the county of Rock and State of Minnesota, have invented a new and Improved Rake, of which the following is a full, clear, and exact description.

This invention has relation to rakes and is in the nature of an improvement over my prior applications Serial Nos. 512,006, 547,773 and 609,975.

The present invention seeks for its principal object to materially simplify the construction and reduce the cost of the manufacture of a rake of the character set forth.

As a further object the invention contemplates in combination with a rake having a handle and a rake head formed with a connection therebetween to permit of relative angular movement and adjustable means for limiting the angular movement of the rake head and handle, means for locking said adjustable limiting means against accidental adjusting movement.

The invention furthermore contemplates an improvement in the manner of connecting the rake head and handle and an improvement in the tensioning means which normally tensions the rake head against angular movement and which returns the same to normal position.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a top plan view of a rake constructed in accordance with the invention.

Fig. 2 is a front end view thereof.

Fig. 3 is a sectional view taken approximately on the line 3—3 of Fig. 2 and illustrating the rake head in normal position.

Fig. 4 is a similar sectional view illustrating the relative angular position of the rake head and handle for the clearing of obstructions from the tines.

Fig. 5 is a fragmentary sectional view taken approximately on the line 5—5 of Fig. 2.

Fig. 6 is a fragmentary sectional view taken approximately on the line 6—6 of Fig. 5.

Referring to the drawing by characters of reference, 10 designates the handle of the rake and 11 the head which consists of a tine supporting bar 12 disposed transversely at the end of the handle 10. The tine supporting bar 12 is preferably in the nature of a channel member through the flanges of which the tines 13 extend.

A connection is provided between the rake head and handle to permit of relative angular movement therebetween for the purpose of clearing the tines of obstructions, by the insertion of a downward pressure and forward movement of the rake over the ground. The improved connection includes a sleeve 14 which receives one end of the handle 10, said sleeve being formed at its outer end with a pair of forks or arms 15 connected by a circular cross rod 16. The arms 15 are further provided with outwardly projecting lugs 17 having apertures 18. The tine supporting bar 12 is hinged at the lower inner corner to the sleeve 14 through the medium of a strap 19, the ends of which are clipped as at 20 to the forward edges of the flanges of the channel bar 12. The strap 19 is formed with a semi-circular portion 21 which embraces the circular cross rod 16 of the forks or arms 15. Under this arrangement the flat faces 22 which confront the rear face of the tine supporting bar 12 coact therewith to prevent swinging of the tines in one direction beyond a predetermined position while permitting of the swinging of the same in an opposite direction and at an angle to the handle 10. In order to normally maintain the faces 22 in contact with the rear face of the tine supporting bar and to tension the tine supporting bar and tines against swinging movement during the ordinary raking operation, a flat leaf spring 23 is arranged transversely within the channel portion of the tine supporting bar, said leaf spring having a medial offset 24 which lies between two adjacent tines. The opposite free extremities of the leaf spring are notched inwardly as at 25 to engage over the shanks of the bolts 24 which extend through the apertures 18 in the lugs 17 and aligned apertures 27 in the tine supporting bar.

The heads 28 of the bolts 26 are engaged by the leaf spring extremities 23 whereby the swinging of the tines and tine supporting bar from their normal position places the spring under tension. The threaded opposite ends 29 of the bolts extend through the apertured lugs 17 and have threaded thereon adjustable abutments 30 in the nature of thumb nuts, whereby the swinging movement of the rake head may be adjustably limited. In order to prevent accidental turning movement of the adjustable abutments or thumb nuts 30, the rear faces of the lugs 17 are preferably V-shaped to provide a transverse rib 31, while the confronting faces of the abutments or thumb nuts 30 are grooved as at 32. Under this arrangement the tension of the spring will operate to maintain the ribs 31 in the grooves 32 after the adjustment has been made.

I claim:

1. A rake including a handle, a rake head and a connection therebetween to permit of relative angular movements of the head and handle, said connection comprising a forked sleeve carried by the end of the handle, a cross rod connecting the forks of said sleeve, a strap clipped to the rake head and having a semi-circular portion embracing the cross rod to hingedly connect the rake head for angular swinging movement in one direction, said rake head being limited in its movement in the opposite direction by contact with the forks and means for adjustably limiting the angular swinging movement of the rake head comprising apertured lugs projecting from the forks, apertured portions in the rake head, bolts extending through said apertured portions having heads at their outer ends and nuts threaded on the inner ends, and a leaf spring mounted on the head and engaging the bolt heads for holding the rake head normally in abutting relation to the forks and for tensioning the same against angular movement.

2. A rake including a handle and a head, of a connection therebetween to permit of relative angular movements therebetween, said connection comprising a forked sleeve carried by one end of the handle, a cross rod connecting the forked portion of the sleeve, a strap secured to the head having a semi-circular portion embracing the cross rod, apertured lugs projecting from the forked portion, apertured portions in the head, bolts extending through said apertured lugs and apertured portions, and a leaf spring having notched opposite extremities embracing the bolts, said spring having a medial bearing portion on the head and engaging at its opposite ends the bolt heads for tensioning said head against angular movement.

3. A rake including a handle and a head, of a connection therebetween to permit of relative angular movements therebetween, said connection comprising a forked sleeve carried by one end of the handle, a cross rod connecting the forked portion of the sleeve, a strap secured to the head having a semi-circular portion embracing the cross rod, apertured lugs projecting from the forked portion having rear V-shaped faces, the apexes thereof providing transverse ribs, apertured portions in the head, bolts extending through said apertured lugs, and apertured portions having heads at their forward ends and nuts threadedly engaged on their inner ends, said nuts having a groove engageable with the ribs, and a spring interposed between the apertured portions and the heads of the bolts for normally tensioning said head against angular movement and for maintaining the grooved nuts in engagement with the ribs.

BERT ELWOOD LEAS